US007883627B1

(12) United States Patent  
Barrett

(10) Patent No.: US 7,883,627 B1
(45) Date of Patent: Feb. 8, 2011

(54) AUTOMATED FUEL POLISHING SYSTEM AND METHODS

(76) Inventor: Douglas P. Barrett, 28011 Chapulin, Mission Viejo, CA (US) 92692

(*) Notice: Subject to any disclaimer, the term of this patent is extended or adjusted under 35 U.S.C. 154(b) by 0 days.

(21) Appl. No.: 12/655,314

(22) Filed: Dec. 28, 2009

Related U.S. Application Data

(63) Continuation of application No. 12/262,619, filed on Oct. 31, 2008, now abandoned.

(51) Int. Cl.
 B01D 17/12 (2006.01)
 B01D 37/00 (2006.01)
 B01D 37/04 (2006.01)

(52) U.S. Cl. .................. 210/805; 210/741; 210/138; 210/196; 210/197

(58) Field of Classification Search .............. 210/138, 210/196, 197, 741, 805; 134/169 A
See application file for complete search history.

(56) References Cited

U.S. PATENT DOCUMENTS 5,149,433 A * 9/1992 Lien ........................... 210/641
5,353,760 A * 10/1994 Zager ....................... 123/196 S
6,702,948 B1 * 3/2004 Oberlander ................ 210/695

OTHER PUBLICATIONS

Wil Andrews, "Captn Wil's Polishing System", Oct. 1, 2007, Water World Productions—published on the web at http://trawlersandtrawlering.com.*
Andrews Annotated Figures 1 and 2, Adapted from above reference by Wil Andrews, p. 11.*
Advanced Diesel Solutions New Zealand, DE-BUG Models, accessed from http://www.dieselsolutions.co.nz/products.shtml, 4 pages, product information accessed on Jun. 24, 2008.
Fuel Polishing, Gulf Coast Filters, Inc., Optimum Fuel Quality At All Times, accessed from http://www.gulfcoastfilters.com/fuel_polishing.htm, 7 pages, product information accessed on Jun. 24, 2008.
Photo of GCF Fuel Polishing Systems, Gulf Coast Filters, Inc., accessed from http://www.gulfcoastfilters.com/fuel_polishing_systems.htm, 3 pages, product information accessed on Jun. 24, 2008.
ASA Environmental Products—Fuel Polishing, Diesel Fuel Polishing Systems, accessed from http://www.asa-environmental.com/Catg1.asp?Cat1ID=92&gclid=CJDosYGAjpQCFSEbagodGUNGWw, 2 pages, product information accessed on Jun. 24, 2008.

* cited by examiner

Primary Examiner—Duane Smith
Assistant Examiner—Paul J Durand
(74) Attorney, Agent, or Firm—Stout, Uxa, Buyan & Mullins; Carlos A. Fisher

(57) ABSTRACT

An automated system for fuel polishing stored fuel in multiple storage tanks, and methods for making and using such systems, such methods including the use of an apparatus comprising a pump having a flow velocity sufficient to suspend settled impurities in a fuel storage tank, at least a first and second fuel storage tank each having an inlet and an outlet; said at least one filter; a fluid pathway connecting said pump, said fuel storage tanks, and at least one filter; a first three-way valve positioned at a junction between the inlet of at least said first and second fuel storage tanks; a second three-way valve positioned at a junction between the outlet of at least said first and second fuel storage tanks; and a system controller component operably connected to said first and second three-way valve to automatically control the position of each valve without manual intervention.

20 Claims, 1 Drawing Sheet

AUTOMATED FUEL POLISHING SYSTEM AND METHODS

REFERENCE TO RELATED APPLICATIONS

This is a continuation of U.S. patent application Ser. No. 12/262,619, filed Oct. 31, 2008, now abandoned which is hereby expressly incorporated by reference herein in its entirety.

FIELD OF THE INVENTION

This invention is related to methods and systems for accomplishing an automated cleaning and filtering of fuel, particularly diesel fuel, in situ. Thus the systems and methods of the present invention involve internal combustion engines. These engines may be situated in various locations and used for various purposes, including, without limitation, marine engines, heavy equipment engines, truck engines, and the like.

BACKGROUND OF THE INVENTION

Most engine and motor fuel is comprised of hydrocarbons (molecules having the formula $C_xH_y$; generally, for linear, non-cyclic alkenes, this formula can be simplified to $C_nH_{2n+2}$. Although the present invention may have application to the cleaning and "polishing" of fuels other than hydrocarbon fuels (such as $H_2$ gas), in many applications the present invention concerns hydrocarbon fuels, particularly though not necessarily exclusively, diesel fuels.

Most engine fuel is produced from petroleum (literally "rock oil") as a hydrocarbon mixture made from the fractional distillation of crude oil. Diesel fuel is a definitional term encompassing any fuel that can be used in a diesel engine. Generally, petroleum diesel fuel is made using alkanes from C9 (nonane) to C16 (hexadecane), while gasoline is made from alkanes from C6 (hexane) to C8 (octane). Petroleum diesel has a greater energy density than gasoline, and is easier to refine and produce than gasoline. Other types of diesel fuels can be made from organic or other sources, such as biodiesel, biomass to liquid (BTL) or gas to liquid (GTL) diesel.

A requirement of a diesel fuel is that it be ignitable in the absence of a high voltage spark plug. Due to the manner in which a diesel engine functions, the fuel must ignite when the air inside the cylinder is compressed up to 15 or 25 times its volume at atmospheric pressure and the fuel is then injected into the cylinder at the end of the compression stroke.

Contamination of fuels can be costly and dangerous. Water is the greatest concern because it is the most common form of contaminant. Water may be introduced into the fuel supply during fueling when warm, moisture laden air condenses on the cold metal walls of fuel storage tanks, or from poor housekeeping practices, such as leaky valves, hoses and the like. Water contamination of liquid fuels may result in explosions as heated water becomes steam at a relatively low temperature and expands. Alternatively, the water may stall the engine leading to a potentially dangerous power failure.

Water can also cause damage to injector components and reduce the lubricity of the fuel, which can cause seizure of close tolerance components such as those found in fuel pump assemblies.

Microorganisms, such as fungi and bacteria, live in water and feed on the hydrocarbons found in virtually any hydrocarbon fuel. Bacterial and fungal colonies can multiply and spread throughout a fuel system and quickly plug a fuel filter. The fuel filter will have a slime-like coating over the surface of the media, dramatically reducing the service life of the filter. Bacteria may be any color, but are usually black, green or brown. Draining the system will reduce microbial activity, but will not eliminate it.

Wax crystals can form in diesel fuel as a result of cold temperature precipitation of paraffin from the fuel. These crystals begin as microscopic particles suspended in the fuel, but can grow. Temperatures below a fuel's cloud point will result in wax precipitation and filter plugging. To prevent plugged filters due to wax formation, the cloud point of fuel must be at least 12° Celsius (22° F.) below the lowest outside temperature. Fuel suppliers blend diesel fuel based on local anticipated cold weather conditions. Thus, wax formation is particularly problematic if fuel is obtained outside the locality in which it is used.

Asphaltenes (which are also components of crude oil) are by-products of fuel as it oxidizes. Asphaltene particles are generally thought to be in the 0.5-2.0 micron range and are relatively harmless to the injection system, as they are soft and deformable. However, as these tiny particles pass through the filter they tend to stick to the individual fibers. If a choked filter is cut open after a normal service interval a black, tarry substance would be visible on the dirty side of the element; this is asphaltene (oxidized fuel). Fuel with a high percentage of asphaltenes will drastically shorten the life of a fuel filter.

Numerous surveys have been performed monitoring fuel tanks aboard commercial ships such as tankers and freighters, as well as military ships. On one such survey, sludges collected from fuel tanks on DD-963 ships (Spruance-class destroyers) were assessed to determine the sources of particulate matter, especially particulate matter generated or caused by microorganisms. These ships are powered using gas turbines, which are usually fueled with turbine fuel, which is similar to diesel fuel.

More than eighty fuel tanks on eight different ships were sampled and examined microscopically for the presence of microorganisms and other debris. Assays for viable fungi, yeast and bacteria, including sulfate reducers, were made. Centrifugal fractionation separated the fuel and aqueous phases of the sludges and allowed the volumes of low-density particulates (lighter than water) and sediment to be estimated. The pH and salinity of the aqueous phase were measured and analyses made for organic matter, sulfide and metallic elements in the particulate matter. There were considerable variations in amount, quality and microbial content of the sludges in different tanks even on the same ship. Viable microorganisms were always found but the dominant genera differed considerably. A high aqueous pH and the presence of sulfide were usually correlated with active sulfate-reducing bacteria and a low aqueous pH was always associated with high yeast and fungal content. In some tanks, including service tanks, fungal material made up a substantial portion of the sludge.

Sludge deposits are not unique to fuel tanks on military or commercial ships, and can be found in the tanks of pleasure boats as well. Additionally, of course, the formation of sludges and the contamination of fuel tanks and fuel lines is a common feature of any equipment or vehicle in which fuel may sit unconsumed for a significant period of time.

Thus, fuel, particularly hydrocarbon fuel, stored for any length of time, and particularly in tanks subjected to water infiltration, condensation and the like, are susceptible to microbial contamination or chemical degradation. Besides marine applications, this may apply to applications including trucking, heavy machinery (such as cranes, bulldozers, tractors and the like), oil well pumping and drilling, service station and military fuel storage, and the like.

So-called "fuel polishing" is often used to clean and filter fuel stored in tanks that might have become, or which is at risk of becoming, contaminated. This generally involves using a recirculating pump to draw stored fuel from a tank, direct it through one or more filter and/or contamination removal devices, and direct the fuel back into the tank. Generally the fuel is circulated at a high enough rate to agitate the inside surface of the fuel tank, and suspend sludge that may have formed, particularly on the bottom or sides of the tank. In this way, the suspended sludge and particulate matter can be directed to the filters and the inside of the tank may also be cleaned during the fuel polishing operation.

Generally, when the fuel in one tank has been sufficiently cleaned, the pump (including any hosing and filter apparatus attached thereto) is moved to another tank (if present) and the process is repeated until the fuel in all the tanks (and optionally the fuel line(s)) has been filtered free of sludge, algae, bacteria, and non-biological impurities.

For example, in a commonly performed fuel polishing procedure, a boat or ship is brought alongside a fuel dock, and an inlet hose and an outlet hose is introduced into the fuel tank. A pump connected to one or more filter is then turned on and permitted to run at sufficient velocity to cause the suspension of sludge, water, and solids in the fuel, and for sufficient time to substantially filter the fuel in the tank. Occasionally filters may be changed, typically beginning with a large pore filter, and decreasing the pore size until a substantial amount of the fungi and bacteria can be removed from the fuel.

Similarly, small "on-board" or integrated fuel polishing systems are known, which generally involve a pump that circulates fuel through one or more filters, and manually switching valves to change the source, filters or filterbanks, and/or destination fuel tanks.

While fuel polishing systems are presently marketed and sold, these systems consist largely of a series of filters, valves and hoses, which may also contain timers for periodic circulation of the fuel in a single tank. These systems may also contain valves, such as two-way or three-way valves, for manual switching from tank to tank.

SUMMARY OF THE INVENTION

The present invention is directed to a fuel polishing system that can be completely automated, thus permitting scheduling of regular fuel polishing without the need for manual intervention, or even the presence of an operator on site. The system may comprise a multi-tank system or a fuel transfer system. In particular, the fuel polishing system comprises a pump component; one or more automated valves (which may include one or more 2-way and 3-way valves); a switching controller component (which may be part of a system controller component) able to send one or more signals to one or more valve controller components associated with said valve directing the valve to switch from one position (such as an open position) to another position (such as a closed position); and at least one filter component for filtering fuel.

Filter components may comprise "molecular sieve", or size exclusion filters, such as those comprising screens or membranes, or a gel filtration resin, or a combination of such elements. Fuel may be treated with size exclusion filters of progressively smaller pore or screen size. The filter components of the present invention may also, or alternatively, comprise other filter types, including without limitation, an activated charcoal filter component, a cation exchange resin component, an anion exchange resin component, a silica or alumina-containing filter component having a hydrophilic surface chemistry (such as a hydroxyl derivatized surface), and the like.

Preferably, the pump has a sufficiently high flow rate that the filtered fuel being directed back into the tank provides an agitation of the fuel within the tank able to suspend solid particulate contaminants and sludge from the walls and floor to the tank.

As one relatively simple and non-exclusive example, a multi-tank fuel polishing system according to the present invention may comprise a fuel pump component for circulating fuel in a first fluid circuit for a first period of time from a first tank through one or more filter and a three way valve (not necessarily in that order), and back into the fuel tank.

Following the end of the first period of time, a switching controller component sends a signal to a valve controller component, which causes the switching of the three-way valve (and optionally also closing selected two-way valves), thereby ending the first circuit or cycle. For example, switching the three-way valve (and optionally opening selected two-way valves) may result in closing the first circuit and opening a second circuit permitting the circulation of fuel for a second period of time from a second tank through one or more filters and said three-way valve (not necessarily in that order) and back into the second fuel tank.

At the end of the fuel polishing cycle, a system controller component, which may include the switching controller component of the fuel polishing system, may turn the pump off and may start a timer for triggering the next fuel polishing cycle, typically although not exclusively, to occur within about 1 month to about six to eight months or more.

In another embodiment the fuel in a single tank may be polished and transferred from the original tank to a second fuel tank. In this embodiment the first step may be similar to the embodiment described immediately above with regard to the first fuel circuit, followed by a second step whereby an automated valve is switched, and the cleaned fuel is directed into a second fuel tank. Alternatively, this embodiment may involve recirculation of the fuel in a first tank during a first fuel polishing step, and a final transfer step, wherein the cleaned fuel is led through a fuel outlet to a second tank.

In other embodiments the present invention comprises a method for periodically cleaning fuel stored in two or more tanks. In this method, fuel stored in a first tank is circulated in a first fluid path for a first predetermined period of time through at least one filter structured to remove at least one fuel impurity, and at the end of the first predetermined period of time, a switching controller component subsequently automatically actuates one or more valve, thereby closing the first fluid path and causing the circulation of fuel stored in a second tank in a second fluid path through at least one filter structured to remove an impurity for a second predetermined period of time, wherein said switching controller component comprises one or more system component for carrying out the automatic steps.

The system controller component, switching controller component, and value controller components may be any components able to carry out the functions of the automated fuel polishing system.

Thus, the system controller component may comprise a microprocessor, a personal computer, or other system console. Generally, the system controller comprises a software program contained in system memory, read only memory (ROM), flash memory, a binary file, or system firmware which controls the valves and is capable of switching one or more valve position at the end of each predetermined period of time that is programmed. Very preferably, at least a certain amount of information (such as one or more of time, date, and circulation period, and the identity of the fuel tanks to be circulated) is able to be programmed into the system controller by the user via a user interface, such as (without limitation dip switches, switches, an LED, LCD or video display, and/or digital program logic).

Overall, the system controller component may include a switching controller component, pressure regulator components, flow controller components, valves (such as on/off valves or three-way valves), valve controller components, flow restrictors, pressure drop detection or measurement devices or components, combinations thereof, or any device capable of affecting one or more properties of a fluid in the fuel polishing system, such as flow rate or pressure.

The valve controller component may comprise, any mechanism for opening and/or closing a valve or changing the direction or rate of fluid flow. For example, a valve controller may comprise a remotely controlled solenoid or motor controller component capable of changing the fluid path from one direction to another. Preferably, the valve controller component comprises a motor or digital valve controller component capable of monitoring parameters such as, without limitation, system backpressure and reporting this information back to the system controller component. For example, the valve controller component may detect and send data to the system controller component indicating that system pressure has fallen below a certain threshold value, thereby indicating a leak or failure in the fluid path.

Alternatively, the valve controller component may detect, and send data back to the system controller component indicating that the fluid path system pressure has raised above a certain threshold value, indicating for example, a pump failure or a blockage of the filter or another part of the fuel path. In either case the system controller may be programmed to turn the pump off under pressure conditions indicating a potential hazard.

The person of ordinary skill in the art will recognize that the system of the present invention may easily be adapted to use direct current (DC) or alternating current (AC). Indeed, fuel polishing systems of the present invention may be designed to be capable of operating in either DC or AC modes, depending upon whether access to an electrical grid (such as "shore power") is possible at a given point in time or not, or by utilizing, for example, an on-board 12 or 24 volt DC battery source.

DETAILED DESCRIPTION OF SELECTED EMBODIMENTS

Figure 1:
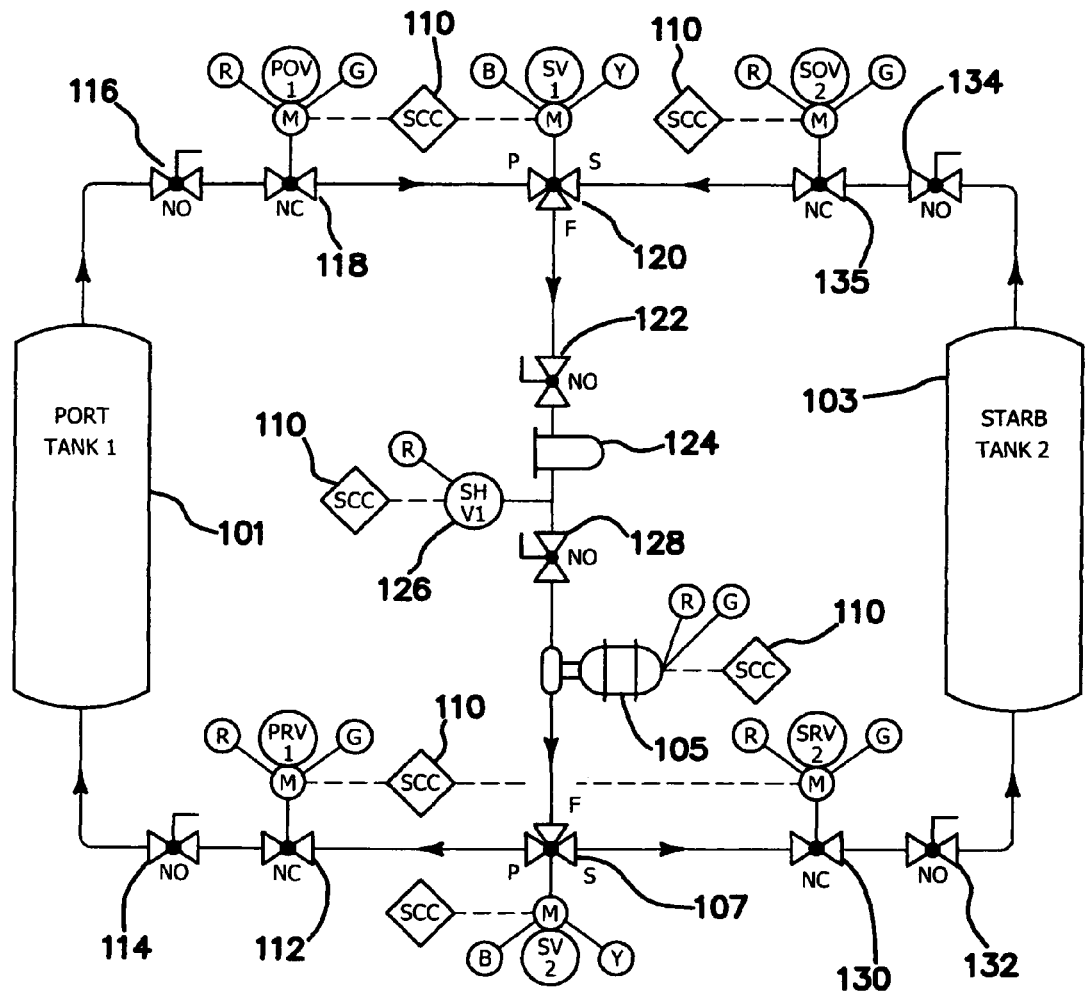
FIG. 1 is a schematic drawing of one embodiment of the automated fuel polishing system of the present invention showing the two alternative fluid paths for diesel fuel polishing in a marine vessel having a port fuel tank and a starboard fuel tank and automated valves.

The present invention is directed to apparatus and methods for the automated removal of at least one contaminant from a fluid fuel contained in at least two different storage vessels.

By fluid fuel is meant that the contaminant is removed from the fuel while the fuel is in a flowable, fluid form. This fluid form may be in a gaseous form (such as, without limitation, as in fluid fuel comprising a combustible natural or petroleum gas such as hydrogen gas, propane, methane, butane or natural gas). However, preferably the fluid form is a liquid, such as liquid diesel fuel, gasoline, liquid petroleum gas, liquid natural gas, turbine fuel, and the like.

If the fuel is in a gaseous form, all fittings and connections of the fuel polishing system of the present invention must be gas-tight to ensure that there is no leakage of fuel from the fuel polishing system. In such a case, the filter may be adapted or constructed specially to optimize the infiltration and treatment of the gas.

For example, in the treatment of hydrogen gas, a filter may comprise a proton exchange membrane, or PEM, containing platinum. The platinum acts as a catalyst that separates electrons from the hydrogen gas atoms. The free electrons are gathered as current, and the positively charged hydrogen ions pass through the membrane where they readily combine with oxygen atoms to form water.

However if the hydrogen gas contains impurities, such as water vapor or carbon monoxide, it can "gum up" subsequent filters or membranes in the system, or in subsequent applications, such as in a fuel cell membrane separator. Palladium acts like an atomic filter—the hydrogen atoms readily diffuse right through the metal. For example, an alloy of 73 percent palladium and 27 percent silver is drawn into long thin tubes, about 3 mm in diameter and 20 feet long. Clusters of these tubes can be placed inside a vacuum chamber and heated to between 400 and 500 Celsius. Impure hydrogen gas is then pumped into the small tubes; the hydrogen readily diffuses through the palladium-silver tube walls and may be captured in the outer chamber while the impurities travel out the other end of the tubes.

Similarly, the present invention may comprise apparatus and methods for the automated polishing of natural gas, propane, butane and methane stored in one or multiple tanks. In such cases, filters may comprise for example, polyester-felted media or polyester/cellulose media, both of which remove solid particles such as rust, dirt, pipe scale, iron oxide and other dry particulates 10 microns in diameter and larger. Other natural gas filters may comprise cartridges built with layers of borosilicate fiberglass sandwiched into layers of felted polyester media to remove liquid (e.g., water and oil) droplets, slugs, fogs, and mists, plus all particulate matter down to 0.3 microns in size.

Regardless of the filter type, all fuel filters and fuel polishing lines need to be capable of withstanding the pressures inherent in using such a fuel. Thus, for hydrogen or natural gas or propane, butane or methane, the filters, fittings and lines must be capable of withstanding pressures of, for example, up to 180 psi, or up to 285 psi, or up to 740 psi, or up to 1480 psi. For liquid fuels (and depending upon the application) the system pressures will normally be lower, with components required to withstand pressures of up to about 500 psi or up to about 2250 psi, or up to about 150 psi, or up to about 50 psi.

Fuel-carrying lines, fuel tanks, and valves must also be capable of withstanding fuel polishing operating pressures without leakage. For gas fuels, this generally means that fuel lines are metallic in nature. For liquid fuels, particularly when the fuel polishing operating pressure is relatively low, fuel lines may be made of tubing, such as rubber, neoprene, steel reinforced polymeric materials, or rubberized hosing.

The Applicant presently contemplates that the automated fuel polishing systems of the present invention will often (although not exclusively) be designed to be used in a marine environment. In most cases the fuel system will be a diesel fuel system, although some marine fuel systems utilize gasoline or turbine fuel.

In a marine diesel system the fuel polishing system may contain one or more of the following components: a fuel filter/water separator; a filter for particulates below about 1 micron (e.g., 0.5 micron cutoff); a separate pump having plastic, rubber, stainless steel and/or bronze water-contacting surfaces; a water detector with optional alarm; a vacuum switch and/or gauge, bronze fittings and valves rated at for example, about 40 gallons per hour, or about 60 gallons per hour, or about 80 gallons per hour, or about 100 gallons per hour, or about 140 or 280 gallons per hour (for systems having 500 or 1000 gallon tanks, for example). As indicated above, sensors and detectors (for detecting system pressure, the presence of water, the presence of particulates etc.) are preferably electronic in nature, and result in a signal being generated and transmitted to the system controller component, which is programmed to respond to such a signal, for example, by turning the pump off, by closing one or more valve, or by sounding an alarm.

It will be understood that the automated fuel polishing system of the present invention may have applicability to marine engine applications, trucking and land-based motor vehicles, heavy equipment such as cranes, earthmovers and the like, where fuel may be stored for prolonged periods of time. Also, the oil industry utilizes fuel stored in fuel tanks for pumps and other equipment, and the automated fuel polishing systems of the present invention have applicability to them as well. Gasoline stations and facilities with a number of underground fuel storage locations may also benefit from automated fuel polishing systems to clean the fuel stored for more than 2 weeks or so.

The Examples presented in this patent application are intended to be illustrative and not limiting. The claim language concluding the specification alone defines the invention claimed in this patent application.

EXAMPLE 1

Referring now to FIG. 1, an exemplary marine diesel embodiment of the automated fuel polishing system of the present invention is provided, with port and starboard fuel tanks (101 and 103, respectively) indicated. The fuel is pumped via pump 105 to automated three-way valve 107. The pump and various valves are fitted with green and red lights, such as light emitting diodes (LEDs), labeled R and G. The red light is displayed if the pump is stopped or if the valve is shut; a green light is displayed if the pump is operable or if the associated valve is open or positioned properly. The three way valves are fitted with differently colored lights; in this case blue (B) or yellow (Y) lights, respectively, indicate if the port or starboard fuel lines and tanks are being accessed.

Pump 105 is also electronically connected to a system controller component (SCC) or microprocessor (110) and responds to signals sent from the SCC by turning off and/or turning on.

When the port fuel lines and fuel tank are to be accessed, the automated return three-way valve 107 is controlled using a switching controller component contained within the SCC 110 to close access to the starboard fuel lines and open access to the port fuel lines; thus, the blue light would indicate that the valve is accessing the port lines.

Although FIG. 1 shows the SCC 110 in multiple locations in the schematic, this is shown for convenience's sake; the Applicant contemplates a single SCC having multiple connections to different components of the fuel polishing system shown in FIG. 1.

Fuel traveling along the port fuel circuit reaches automated port return valve 112, which is left in the closed position when the fuel polishing system is not being used. Port return valve 112 is opened when the three-way valve is actuated in the port position, and is also connected to the SCC, as shown by the dotted line. Manual return valve 114 is normally left in the open position, but may be closed to prevent fuel leakage when the fuel polishing system is not being used.

Fuel is returned to port fuel tank 101, and then exits the fuel tank through the tank outlet (not shown), passing through manual outlet valve 116 (normally left in the open position) and automated port out valve 118, which is also connected to and receives signals from the SSC and is normally in the closed position when not in use. The automated port out valve 118 also has green and red lights indicating when the value is in the open or closed position, respectively.

Outlet automated three-way valve 120 is essentially the counterpart to automated return three-way value 107; it receives signals from the system controller component 110 directing it to open the port or starboard fuel circuit. Like the return three-way valve 107, a blue light (B) indicates that the port fuel circuit is in use, while a yellow light (Y) indicates that the starboard fuel circuit is in use.

The three-way valve directs the fuel flow through manual valve 122 (which is normally left open) to filter or filterbank 124. Downstream from the filter or filterback is a vacuum switch 126, which detects a drop in system pressure caused, for example, by blockage of the filter(s). If the vacuum is greater than a certain preset value, the vacuum switch sends a signal to the system controller component, which can then, for example, turn the pump off or cause the occurrence of some other action in the system that will alleviate the negative pressure.

Finally, the fluid flow passes through manual valve 128, and back into the pump 105.

When the fuel polishing system of the present invention has completed cleaning the fuel in the port tank, the system controller component can switch automatically to the starboard circuit/cycle, or can shut the system down depending upon the user's desires, for example as programmed in the user interface selection. The starboard circuit is exactly comparable to the port circuit with automated starboard return valve 130 and automated starboard out valve 135 (both of which are normally closed) opened, linked and responding to signals from the SCC, manual return valve 132 and manual out valve 134 usually placed in the open position. As in the port fuel circuit, the automated valves are lighted, with a green light indicating that the valve is open, and a red light indicating that the valve is closed. The starboard fuel circuit also shares manual valve 122, filter (or filterbank) 124, vacuum switch 126, and manual valve 128 with the port fuel circuit.

The automated valves of the embodiment of the invention shown in FIG. 1 can be fabricated or purchased from appropriate suppliers. The valves are preferably ball valves, but may be any appropriate valve type, including without limitation gate valves, butterfly valves, louver valves, globe valves, plug valves, solenoid valves, and knifegate valves; likewise the valve actuation and automation may be, for example, pneumatic, electric or hydraulic in nature.

I claim:

1. A system for removing impurities from fluid fuel stored in two or more tanks comprising an apparatus comprising:
   a pump having a flow velocity sufficient to suspend settled impurities in a fuel storage tank;
   at least a first and second fuel storage tank each having an inlet and an outlet;
   at least one filter;
   a fluid pathway connecting said pump, said first and second fuel storage tanks and at least one filter;

a first three-way valve positioned at a junction between the inlets of at least said first and second fuel storage tanks;

a second three-way valve positioned at a junction between the outlets of at least said first and second fuel storage tanks; and a system controller component operably connected to said first and second three-way valve and controlling the position of each said first and second three-way valve thereby causing fluid fuel stored in said first fuel storage tank to circulate in a first closed fluid path through said at least one filter and return to said first fuel storage tank for a first predetermined period of time, and subsequently automatically causing fluid fuel stored in said second fuel storage tank to circulate in a second closed fluid path through at least one filter and return to said second fuel storage tank fluid, whereby, following programming, said system controller component controls the actuation of the three-way valves without manual intervention.

2. The system of claim 1 wherein the filter of the first fluid path and the second fluid path is the same.

3. The system of claim 1 wherein the filter of the first fluid path is different from the filter of the second fluid path.

4. The system of claim 1 comprising more than one filter in said first closed fluid path.

5. The system of claim 1 wherein the fuel is liquid, is circulated using a pump and the flow rate of the fuel is sufficient to agitate the inside of at least one fuel tank, thereby suspending impurities located on the bottom of the fuel tank.

6. The system of claim 1 wherein the impurities are selected from the group consisting of water, dirt, solids, sludge, fungal growth, bacterial growth, protozoan growth, and compounds resulting from degradation of the fuel.

7. The system of claim 1 wherein the first and second fluid path have at least a portion in common.

8. The system of claim 1 comprising one or more pressure sensing components.

9. The system of claim 1 wherein one or more valve is automatically actuated by a valve controller component.

10. The system of claim 9 comprising one or more pressure sensing component structured to transmit a signal to the system controller component, wherein the system controller component can stop the circulation of fuel if the system pressure is higher or lower than a preset value.

11. The system of claim 10, which is a diesel fuel system.

12. The system of claim 11, which is a marine diesel fuel system.

13. A method for cleaning fuel stored in a fuel tank, comprising programming and activating a system controller component to automatically circulate fuel stored in a first tank in a first fluid path for a first predetermined period of time through at least one filter structured to remove at least one fuel impurity, wherein at the end of the first predetermined period of time the system controller component automatically, without manual intervention, closes the first fluid path and circulates fuel stored in a second tank in a second fluid path through at least one filter structured to remove at least one fuel impurity for a second period of time, thereby sequentially cleaning fuel stored in said first and second tank, respectively, and wherein closing and circulating steps comprise the system controller automatically causing two or more three-way valves to actuate.

14. The method of claim 13 wherein the system controller component is structured to direct a fuel circulation pump to turn on during automated cleaning of fuel stored in said tank.

15. The method of claim 13 wherein the system controller component is structured to direct a fuel circulation pump to turn off after completion of automated cleaning of fuel stored in said tank.

16. The method of claim 13 wherein the system controller component is structured to receive system pressure information from a sensor in the first or second fluid path.

17. The method of claim 16 wherein the system controller is structured to turn off the pump if system pressure information exceeds a system pressure maximum value.

18. The method of claim 16 wherein the system controller is structured to turn off the pump if system pressure information is less than a system pressure minimum value.

19. A system for cleaning and transporting fuel stored in a first fuel tank into a second fuel tank, comprising a programmable system controller component, a pump component for transporting fuel and having a flow velocity sufficient to suspend settled impurities in said first fuel storage tank, a filter component, and a second fuel tank, wherein the system controller component is structured to turn on the fuel pump component at a predetermined time, and actuate one or more three-way valves without manual intervention, whereby the fuel is transported from the first fuel tank through the filter component to the second fuel tank, and the system controller then turns the pump off.

20. The system of claim 19 wherein the system first circulates the fuel stored in the first fuel tank for a predetermined period of time, then transfers the cleaned fuel to the second tank.

* * * * *